United States Patent [19]

Yoneyama

[11] Patent Number: 4,924,561
[45] Date of Patent: May 15, 1990

[54] SINGLE-FIN FASTENER
[75] Inventor: Norihiro Yoneyama, Aichi, Japan
[73] Assignee: Yazaki Corporation, Tokyo, Japan
[21] Appl. No.: 238,076
[22] Filed: Aug. 30, 1988
[30] Foreign Application Priority Data Aug. 31, 1987 [JP] Japan .............................. 62-133165[U]

[51] Int. Cl.⁵ .............................................. A44B 17/00
[52] U.S. Cl. ........................................ 24/453; 24/297;
411/508; 439/557
[58] Field of Search ................. 24/453, 458, 292, 293,
24/297, 614, 615, 618; 411/508, 509, 510;
439/557, 862

[56] References Cited
U.S. PATENT DOCUMENTS 3,790,923 2/1975 Mathe .................................. 439/557
4,245,879 1/1981 Buck ................................ 439/557 X
4,517,711 5/1985 Tanaka ................................... 24/453

FOREIGN PATENT DOCUMENTS 2227163 1/1973 Fed. Rep. of Germany ...... 411/508
2111579 7/1983 United Kingdom .

Primary Examiner—Laurie K. Cranmer
Attorney, Agent, or Firm—Sughrue, Mion, Zinn, Macpeak & Seas

[57] ABSTRACT

A single-fin fastener can be used in which an engaging fin has a flexible hinging butt at a tip of a support board projecting from a base member or the like and extends from the butt in a direction opposite that of the projection of the board. The fin includes an engaging notched portion and a stopper extending therefrom to a movable tip of the fin. An opening preventive portion is continuously attached to the base member or the like and faces the stopper across a gap.

13 Claims, 2 Drawing Sheets

SINGLE-FIN FASTENER

BACKGROUND OF THE INVENTION

The present invention relates to a single-fin fastener for attaching a base member to the hole of another member such as a panel.

FIG. 1 shows a conventional single-file fastener B comprising a support board 1 integrally formed on a synthetic resin base member A and projecting therefrom, and an engaging fin 3 having a flexible hinging butt 2 at the tip of the support board 1 and extending from the tip of the board 1 in a direction opposite to that of the projection of the board. The engaging fin 3 includes an engaging notched portion 3a near the movable tip of the fin. FIG. 2a shows the state that the synthetic resin base member A is attached to the hole 4 of a panel C by the single-fin fastener B. When a force F of 4 to 5 kg acts on the base member A in such a direction as to pull the member out of the hole 4 of the panel C, as shown in FIG. 2B, stress concentrates on the structurally weakest flexible hinging butt 2 so that the engaging fin 3 is opened to a limit. As a result, the single-fin fastener B is easily pulled out of the hole 4 of the panel C, starting with the support board 1 of the fastener. This is a problem.

SUMMARY OF THE INVENTION

The present invention was made in order to solve the above-mentioned problem.

Accordingly, it is an object of the present invention to provide a single-fin fastener which has an advantage of being a compact attaching means and has an increased fastening power.

In the single-fin fastener provided in accordance with the present invention, an engaging fin has a flexible hinging butt at the tip of a support board projecting from a base member or the like and extends from the tip of the board in a direction opposite to that of the projection of the board. The engaging fin includes an engaging notched portion and a stopper extending therefrom to the movable tip of the engaging fin. The single-fin fastener is provided with an opening preventive portion extending continuously to the base member or the like and facing the stopper across a gap.

DESCRIPTION OF THE PREFERRED EMBODIMENTS

The present invention will now be described with reference to the accompanying drawings.

Figure 1:
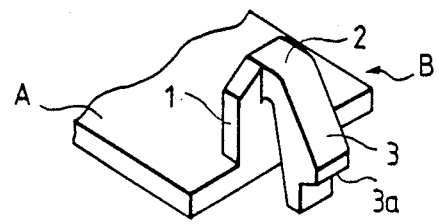
FIG. 1 shows a perspective view of the conventional single-fin fastener.
Figure 2A:
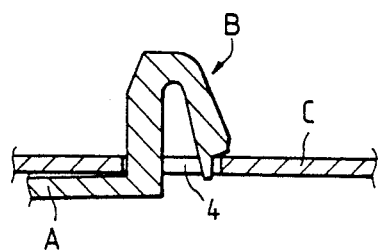
FIGS. 2A and 2B show sectional views of the conventional single-fin fastener in use.
Figure 2B:
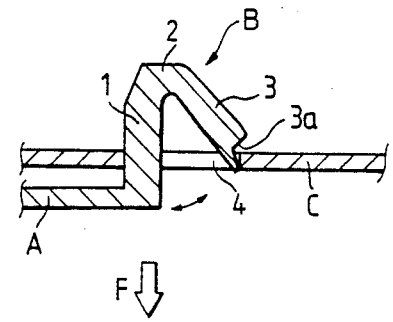
Figure 3:
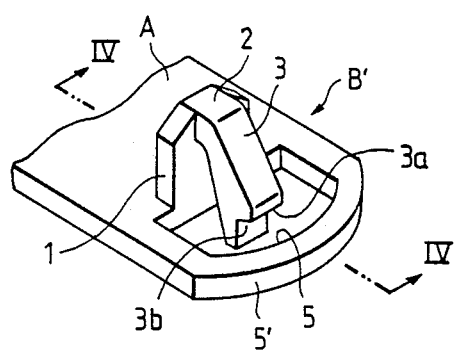
FIG. 3 shows a perspective view of a single-fin fastener which is an embodiment of the present device.
Figure 4:
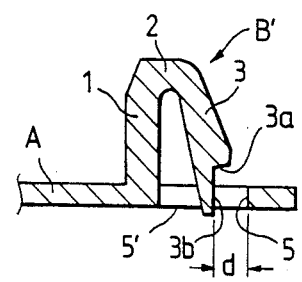
FIG. 4 shows a sectional view of the single-fin fastener along a line IV—IV shown in FIG. 3.
Figure 5:
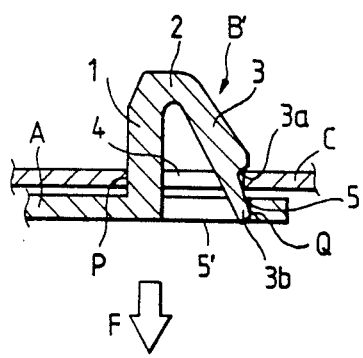
FIG. 5 shows a sectional view of the single-fin fastener in use.
Figure 6:
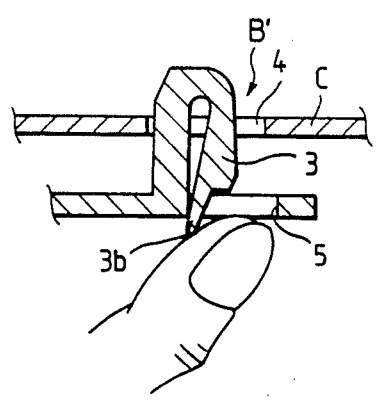
FIG. 6 shows a sectional view of the single-fin fastener being detached.

FIG. 3 shows a single-fin fastener B' according to an embodiment of the present invention. The single-fin fastener B' has the same basic constitution as the above-mentioned conventional single-fin fastener B with regard to a support board 1 on a base member A, a flexible butt 2 and an engaging fin 3, but is different from the latter with regard to an opening preventive portion 5 which is provided to prevent the engaging fin from being excessively opened. The opening preventive portion 5 is constituted by an inside part of the ring 5' of the base member A, and faces the stopper 3b of the engaging fin 3 across a gap d as shown in FIG. 4. The single-fin fastener B' is put in the hole 4 of the panel C so that the base member A is attached to the panel by the single-fin fastener. When a force F of 13 to 14 kg acts on the base member A in such a direction as to pull the single-fin fastener B' out of the hole 4 of the panel C, the stopper 3b of the engaging fin 3 comes into contact with the opening preventive portion 5, as shown in FIG. 5, so that the force is borne by the contact P between the support board 1 and the inside surface of the base member A along the hole 4 thereof and the contact Q between the stopper and the opening preventive portion to prevent the engaging fin 3 from being further opened. The fastening power of the single-fin fastener B' is thus increased. Besides, the base member A can easily be detached from the panel C by manipulating the stopper 3b of the engaging fin 3 of the fastener B' with a finger as shown in FIG. 6.

Figure 7A:
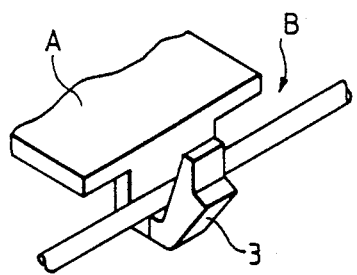
FIG. 7A shows a perspective view of a conventional single-fin fastener holding an electric wire.
Figure 7B:
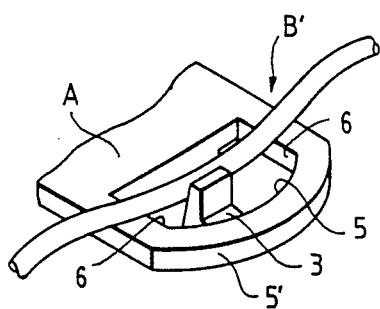
FIG. 7B shows a perspective view of the single-fin fastener of the present invention holding an electric wire.

Although the conventional single-fin fastener B has a drawback that an electric wire held by the fastener is located deep therein as shown in FIG. 7A, the single-fin fastener B' does not have such a drawback. Electric wire entrainment preventing portions 6 of the opening preventive portion 5 of the ring 5 keep such an electric wire from being located deep in the fastener, as shown in FIG. 7B. For that reason, the single-fin fastener B' is prevented from being damaged and is easily detached.

Although the opening preventive portion 5 is constituted by the inside part of the ring 5' in the above-described embodiment, the present invention is not confined thereto but may be otherwise embodied so that a hole is made in the plate-like portion of a base member similar to the base member A and the inside surface of the base member along the hole is used as an opening preventive portion.

According to the present invention, a single-fin fastener is composed of a support board projecting from a base member or the like, and an engaging fin having a flexible hinging butt at the tip of the support board and extending from the butt in a direction opposite that of the projection of the support board. The engaging fin includes an engaging notched portion and a stopper extending therefrom to the movable tip of the fin. The single-fin fastener includes an opening preventive portion continuous to the base member or the like and facing the stopper across a gap. As a result, the fastening power of the single-fin fastener is tremendously increased.

What is claimed is:

1. A single-fin fastener comprising:
   a base member;
   a support board projecting from said base member;

an engaging fin having a flexible hinging butt at a tip of said support board, said engaging fin extending from said flexible hinging butt in a direction opposite that of the projection of said support board, said engaging fin including an engaging notched portion and a stopper extending from said engaging notched portion to a movable tip of said fin; and opening preventing means for preventing said stopper from opening more than a predetermined amount, said opening preventing means being in a fixed position with respect to said base member and facing said stopper through a gap.

2. The single-fin fastener according to claim 1, wherein said opening preventing means includes a closed ring portion.

3. The single-fin fastener according to claim 2, wherein said opening preventing means includes a pair of spaced electric wire entrainment preventing portions.

4. The single-fin fastener according to claim 1, wherein said opening preventing means includes a pair of spaced electric wire entrainment preventing portions.

5. The single-fin fastener according to claim 4, wherein said base member, said opening preventing means, and said pair of spaced electric wire entrainment preventing portions are provided as a single combined plate.

6. The single-fin fastener according to claim 5, further comprising a hole formed in said plate, an inside surface of said plate forming said opening preventing means.

7. The single-fin fastener according to claim 1, wherein said base member is made of synthetic resin.

8. The single-fin fastener according to claim 1, wherein said predetermined amount is equal to an amount at which stress on said fastener due to an opening force is concentrated on a portion or portions of said fastener other than said flexible hinging butt.

9. The single-fin fastener according to claim 1, wherein said predetermined amount is equal to an amount at which stress on said fastener due to an opening force is concentrated at an area between an inside surface of said base member and said support board and at an area between the stopper and the opening preventing means.

10. A single-fin fastener for fastening a base member to an engagement opening of an associated panel member, comprising:

an engageable means for engaging with said opening, said engageable means including a support board projecting from said base member, an engaging fin and a flexible hinging butt for hingingly coupling said support board and said engaging fin to each other, said engaging fin having at a distal free end a stopper for engaging with an opening edge of said engagement opening of said associated panel member; and opening preventing means for preventing said stopper from opening more than a predetermined amount, said opening preventing means being in a fixed position with respect to said base member and facing said stopper when said fastener is located in said engagement opening of said associated panel member.

11. The single-fin fastener according to claim 10, wherein said opening preventing means includes a closed ring portion.

12. The single-fin fastener according to claim 10, wherein said engaging fin includes a notched portion adapted to engage with the opening edge of said panel member.

13. The single-fin fastener according to claim 10, wherein said opening preventing means includes a pair of spaced electric wire entrainment preventing portions.

* * * * *